(12) United States Patent
Won

(10) Patent No.: US 11,363,364 B2
(45) Date of Patent: Jun. 14, 2022

(54) SOUND CONVERTING DEVICE HAVING NEAR-INFRARED RAY EMISSION FUNCTION

(71) Applicant: EM-TECH Co., Ltd., Gyeongsangnam-do (KR)

(72) Inventor: Hyuk Won, Busan (KR)

(73) Assignee: EM-TECH CO., LTD., Gyeongsangnam-do (KR)

(*) Notice: Subject to any disclaimer, the term of this patent is extended or adjusted under 35 U.S.C. 154(b) by 0 days.

(21) Appl. No.: 17/220,314

(22) Filed: Apr. 1, 2021

(65) Prior Publication Data

US 2021/0314695 A1 Oct. 7, 2021

(30) Foreign Application Priority Data

Apr. 3, 2020 (KR) .................. 10-2020-0041022
Apr. 3, 2020 (KR) .................. 10-2020-0041024

(51) Int. Cl.
*H04R 1/10* (2006.01)
*H04R 1/08* (2006.01)
*H04B 10/40* (2013.01)

(52) U.S. Cl.
CPC .......... *H04R 1/1041* (2013.01); *H04B 10/40* (2013.01); *H04R 1/08* (2013.01); *H04R 1/1016* (2013.01); *H04R 1/1075* (2013.01); *H04R 2420/07* (2013.01)

(58) Field of Classification Search
CPC ...... H04R 1/1041; H04R 1/08; H04R 1/1016; H04R 1/1075; H04B 10/40
See application file for complete search history.

(56) References Cited

U.S. PATENT DOCUMENTS

| 8,845,705 | B2* | 9/2014 | Perkins | A61N 5/0622 600/25 |
| 10,286,215 | B2* | 5/2019 | Perkins | A61N 1/36038 |
| 2014/0330336 | A1* | 11/2014 | Errico | A61N 1/3756 607/45 |
| 2017/0027812 | A1* | 2/2017 | Hyde | G16H 10/20 |
| 2017/0043160 | A1* | 2/2017 | Goodall | A61N 7/00 |
| 2017/0113057 | A1* | 4/2017 | Goodall | A61N 1/36031 |
| 2017/0274219 | A1* | 9/2017 | Ernst | A61N 5/0603 |
| 2020/0268260 | A1* | 8/2020 | Tran | A61B 5/0537 |

FOREIGN PATENT DOCUMENTS

| KR | 100624445 B1 | 9/2006 |
| KR | 20090109651 A | 10/2009 |
| KR | 101074882 B1 | 10/2011 |
| KR | 20190061681 A | 6/2019 |

* cited by examiner

*Primary Examiner* — Simon King
(74) *Attorney, Agent, or Firm* — Murphy, Bilak & Homiller, PLLC

(57) ABSTRACT

The present disclosure relates to a sound converting device, and in particular, a sound converting device having a near-infrared ray emission function, which allows a wearer to remain in a stable state by vagal nerve stimulation (VNS) and adjusts a stimulation effect on the wearer by adjusting an intensity of stimulation. A near-infrared ray emitted by an optical device of a light emitting unit has at least one of a set wavelength included in a reference wavelength range, a set frequency included in a reference frequency range, and a set light intensity included in a reference light intensity range, and the optical device operates to correspond to a set duty ratio included in a reference duty ratio.

5 Claims, 2 Drawing Sheets

SOUND CONVERTING DEVICE HAVING NEAR-INFRARED RAY EMISSION FUNCTION

TECHNICAL FIELD

The present disclosure relates to a sound converting device, and in particular, a sound converting device having a near-infrared ray emission function, which allows a wearer to remain in a stable state by vagal nerve stimulation (VNS) and adjusts stimulation effect on the wearer by adjusting an intensity of stimulation.

BACKGROUND

Sound converting devices include sound devices such as wired or wireless earphones, earbuds, and headsets and perform sound reproducing, phone calls, and the like, while performing wireless communication with electronic devices (e.g., smartphones, tablets, etc.).

The related art sound converting devices do not provide a function for health maintenance or a treatment other than the sound reproduction or phone calls to wearers.

SUMMARY

An aspect of the present disclosure provides a sound converting device having a near-infrared ray emission function, which allows a wearer to remain in a stable state by vagal nerve stimulation (VNS) and adjusts stimulation effect on the wearer by adjusting an intensity of stimulation.

According to an aspect of the present disclosure, there is provided a sound converting device having a near-infrared ray emission function, including: a body portion having an accommodating space therein; an eartip mounted on a first side of the body portion and having a sound passage; a speaker configured to emit sound through the sound passage; a microphone formed on the body portion; a communication unit configured to perform communication with an electronic communication device; a light emitting unit mounted on at least one of the body portion, the eartip, and the sound passage and configured to emit a near-infrared ray; and a data processor configured to control the communication unit to perform communication with the electronic communication device, to control the speaker and the microphone to perform a sound reproduction function and a phone call function, and to control the light emitting unit to perform light emission, wherein the light emitting unit includes at least one first optical device emitting a near-infrared ray to a first emission area and at least one second optical device emitting a near-infrared ray to a second emission area, wherein the data processor adjusts an intensity of stimulation to a wearer by performing any one of a first emission mode based on an operation of the first optical device, a second emission mode based on an operation of the second optical device, and a third emission mode based on an operation of the first and second optical devices, wherein the first emission area includes an auricular concha or an ear auricle and the second emission area includes an ear canal in a state in which the sound converting device is worn on the wearer's ear, wherein stimulation to the wearer based on the first emission mode is stronger than stimulation to the wearer based on the second emission mode and stimulation based on the wearer based on the third emission mode is stronger than stimulation to the wearer based on the first emission mode when the same near-infrared ray is emitted, wherein the data processor adjusts an intensity of stimulation to a vagas nerve of the wearer by selecting an emission area corresponding to any one of the first to third emission modes.

The data processor may control the light emitting unit according to set light emission information, wherein the set light emission information may include a set wavelength included in a reference wavelength range, a set frequency included in a reference frequency range, a set light intensity included in a reference light intensity range, and a set duty ratio included in a reference duty ratio, wherein the light emitting unit may emit a near-infrared ray having the set wavelength, the set frequency, and the set light intensity at the set duty ratio, wherein the reference wavelength range may be 810 to 900 nm, the reference frequency range may be 1 Hz to 1 kHz, the reference light intensity range may be 16 to 26 mW/cm$^2$, and the reference duty ratio may be 2 to 10%.

The set wavelength, the set frequency, the set light intensity, and the set duty ratio may be varied within the reference wavelength range, within the reference frequency range, within the reference light intensity range, and within the reference duty ratio, respectively.

The present disclosure provides a light setting (a wavelength, a frequency, intensity of light, an operating duty ratio, etc.) to stimulate sympathetic and parasympathetic nervous systems of a human body, whereby the sympathetic and parasympathetic nervous systems are confirmed to be maintained in a stable state at the time of stimulation by near-infrared ray emission and stimulation to the parasympathetic nervous system is more active than stimulation to the sympathetic nerves system to stabilize a heart rate and increase homeostasis.

The present disclosure has the effect of controlling or varying the intensity of stimulation in the vagas nerve and the effect according to the intensity of the stimulation by selectively or simultaneously providing stimulation by near-infrared ray emission to the vagas nerve according to each emission area.

Those skilled in the art will recognize additional features and advantages upon reading the following detailed description, and upon viewing the accompanying drawings.

DETAILED DESCRIPTION

Figure 1A:
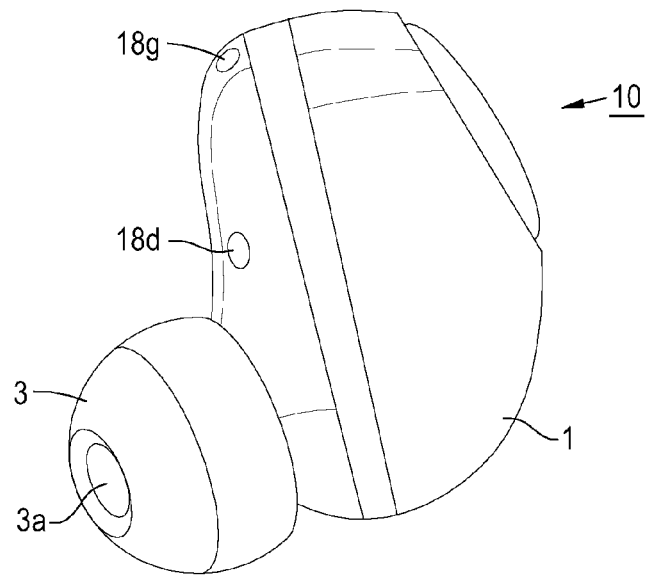
FIGS. 1A and 1B are a front view and a side perspective view of a sound converting device having a near-infrared ray emission function according to the present disclosure.

Hereinafter, various embodiments of the disclosure will be described in detail with reference to the accompanying drawings. Embodiments and terms used herein are not intended to limit the technologies described in the present disclosure to specific embodiments, and it should be understood that the embodiments and the terms include modifications, equivalents, and/or alternatives on the corresponding embodiments described herein. With regard to description of drawings, similar components may be marked by similar reference numerals.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various example embodiments of the disclosure may modify various components regardless of their order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or another element (e.g., third element) may be interposed between them. It may be understood that when an element (e.g., first element) is referred to as being "directly connected," or "directly coupled" to another element (second element), there may be no element (e.g., third element) interposed between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. In some situations, the expression "device configured to" may mean that the device, together with other devices or components, "is able to". For example, the phrase "processor adapted (or configured) to perform A, B, and C" may mean a dedicated processor (e.g., Embedded processor) only for performing the corresponding operations or a general-purpose processor (e.g., central processing unit (CPU) or application processor (AP)) that can perform the corresponding operations by executing one or more software programs stored in a memory device.

The terms used herein are merely for the purpose of describing example embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 1B:
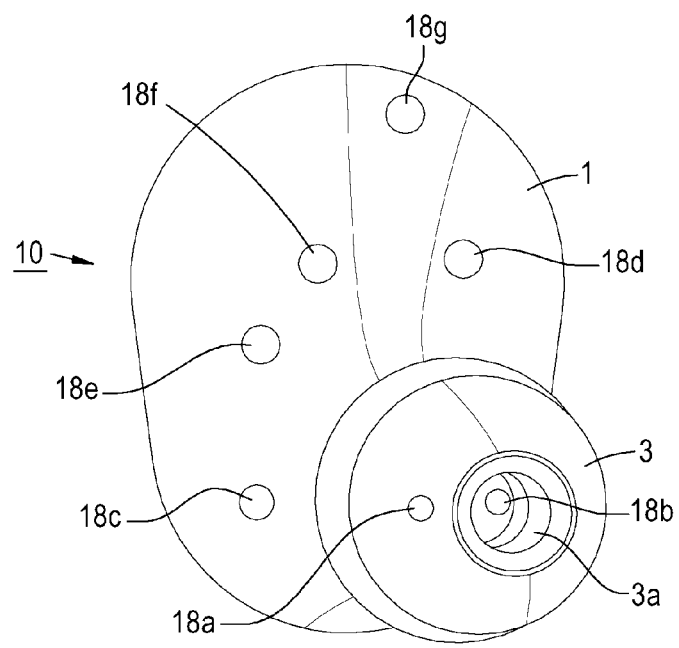

FIGS. 1A and 1B are a front view and a side perspective view of a sound converting device having a near-infrared ray emission function according to the present disclosure.

A sound converting device 10 includes a body portion 1 equipped with a control device such as a circuit board or the like in an accommodating space therein, an eartip 3 mounted on a first side of the body portion 1 and having a sound passage 3a, and at least one optical devices 18a to 18g mounted on the body portion 1, the eartip 3, or the sound passage 3a of the eartip 3.

Figure 2:
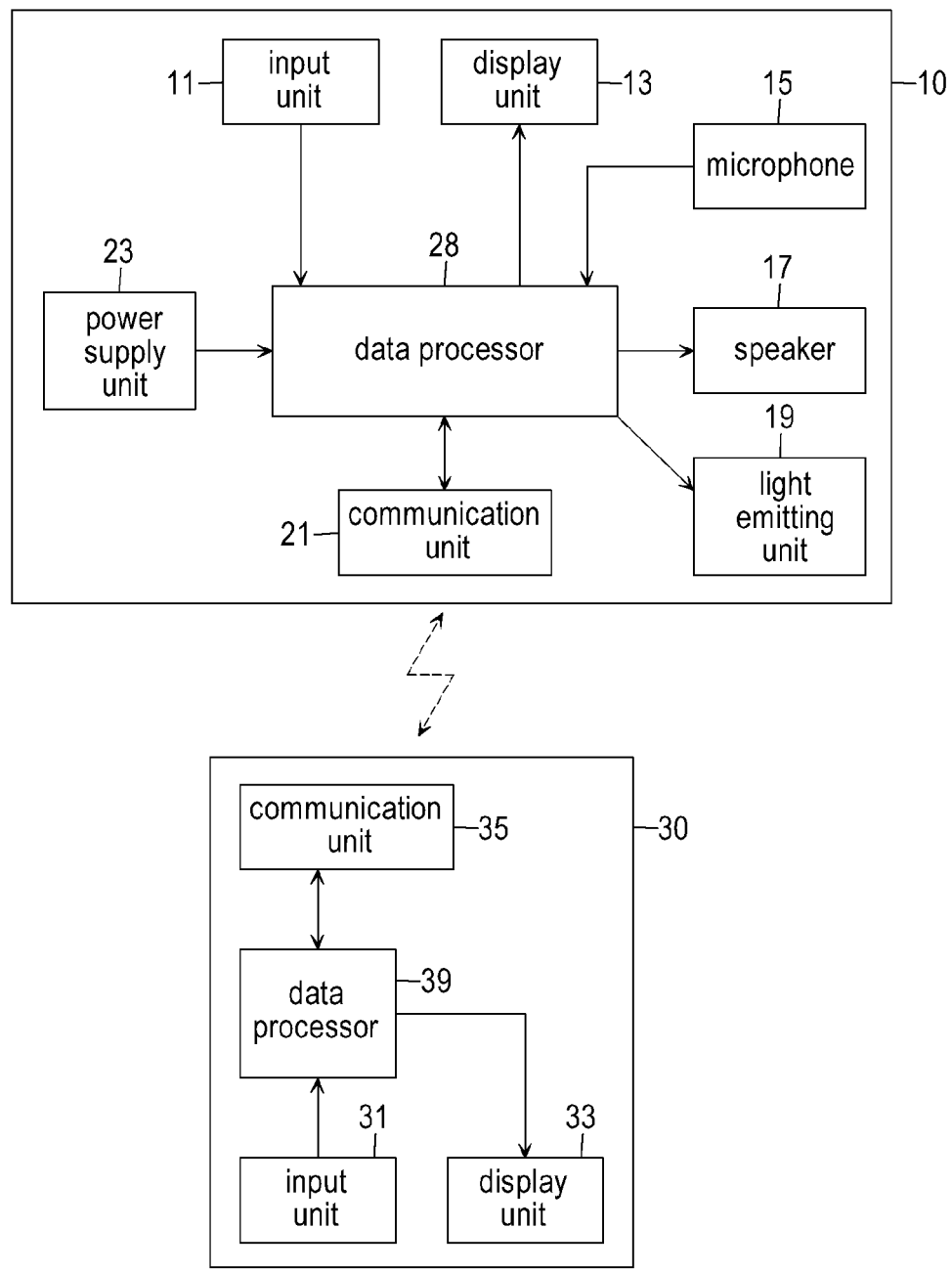
FIG. 2 is a block diagram of a sound converting system including a sound converting device having a near-infrared ray emission function according to the present disclosure.

The body portion 1 includes a control device as shown in FIG. 2 in the accommodating space formed therein and is worn on the outer ear (or auricular concha) when the user wears it, and the eartip 3 is inserted into the ear (e.g., an ear canal). A side opposite to the first side of the body portion 1 (a side symmetrical to the first side with respect to the body portion 1) faces outward when the user inserts the sound converting device 10 into the ear. That is, at least a portion of the first side of the body portion 1 is in close proximity to or in contact with an ear auricle (e.g., an auricular concha), and at least a portion of the eartip 3 is inserted into the ear canal when the wearer inserts the sound converting device 10 in the ear.

Each of the optical devices 18a to 18b mounted on the side of the eartip 3 or in the sound passage 3a emits near-infrared rays to a second emission area, and each of the optical devices 18c to 18g mounted on the body portion 1 emits near-infrared rays to a first emission area. In a state in which the sound converting device 10 is mounted in the wearer's ear, the first emission area corresponds to the auricular concha (ear concha, auricular concha, cavity of concha, etc.) of the ear exposed to the outside, and the second emission area corresponds to the ear canal and an area in the body on an inner side of the ear canal.

When the same near-infrared rays are emitted to each of the first and second emission areas, the intensity or degree of stimulation for the first emission area is greater than the intensity or degree of stimulation for the second emission area due to a position of the vagas nerve formed in the ear. The sound converting device 10 according to the present disclosure adjusts the intensity of the stimulation using strength and weakness of the intensity of the stimulation according to the emission area of near-infrared rays.

FIG. 2 is a block diagram of a sound converting system including a sound converting device having a near-infrared ray emission function according to the present disclosure.

The sound converting system includes a sound converting device 10 performing wired or wireless communication with an electronic communication device 30 and performing a sound reproduction function, a phone call function, and a light emission function and the electronic communication device 30 performing wired or wireless communication with the sound converting device 10 and allowing the sound converting device 10 to perform the sound reproduction function, the phone call function, and the light emission function.

The sound converting device 10 includes an input unit 11 acquiring an input (e.g., power on/off, on/off of a light emission function, selection of an emission mode, wireless communication connection, termination of connection, etc.) from a user and applying the acquired input to a data processor 29, a display unit 13 displaying various information (e.g., power status, whether to perform the light emission function, etc.), a microphone 15 acquiring a sound and applying the acquired sound to the data processor 29, a speaker 17 emitting a sound through the sound passage 3a according to an electrical signal from the data processor 29, a light emitting unit 19 performing light emission according to a control signal from the data processor 29, a communication unit 21 performing wired or wireless communication with the electronic communication device 30, a power supply unit 23 supplying power, and the data processor 29 performing a sound reproduction function, a phone call function, and a light emission function by controlling the components described above.

In addition, a control device including the input unit 11, the display unit 13, the microphone 15, the speaker 17, the communication unit 21, the power supply unit 23, and the data processor 29 is mounted in the accommodating space of the body portion 1.

However, the input unit 11, the display unit 13, the microphone 15, the speaker 17, the communication unit 21, and the power supply unit 23 are technologies that are naturally recognized by those skilled in the art to which the present disclosure pertains, and thus, a detailed description thereof will be omitted.

The light emitting unit 19 is controlled by the data processor 29 and includes a plurality of optical devices 18a to 18g emitting light having a near-infrared band having a wavelength (set wavelength) included in the range of 810 nm to 900 nm and a frequency (set frequency) included in the range of 1 Hz to 1 kHz. For example, the light emitting unit 19 includes LED devices. In addition, the optical devices 18a to 18g emit near-infrared rays having a light intensity included in the range of 16 to 26 mW/cm². In the present embodiment, the light emitting unit 19 controls each of the optical devices 18a to 18g to operate at a duty ratio included in a reference duty ratio range of 2 to 10%, and emit near-infrared rays having the set wavelength included in the reference wavelength range of 810 to 900 nm, the set frequency included in the reference frequency range of 1 Hz to 1 kHz, and a set light intensity included in the reference light intensity range of 16 to 26 mW/cm².

Wavelength characteristics of the emitted near-infrared rays relate to a penetration depth in the first and second emission areas to which the near-infrared rays are emitted, and the penetration depth is maintained to be constant without a significant change within the reference wavelength range. In addition, the frequency and duty ratio of the emitted near-infrared rays relate to repetition of stimulation and affect an effect of the stimulation. In addition, a light intensity of emitted near-infrared rays relates to the influence or effect of stimulation, and stimulation is not effective at a light intensity below the reference light intensity range, and stimulation at a light intensity exceeding the reference light intensity range is harmful to health. In addition, the duty ratio of the emitted near-infrared rays relates to a duration of stimulation and relates to an immediate effect and a sustained effect.

The light emitting unit 19 may selectively control each of the optical devices 18a to 18g according to the duty ratio (set duty ratio) included in the reference duty ratio range of 2 to 10% according to an operation command from the data processor 29. Alternatively, the data processor 29 may operate or stop the light emitting unit 19 according to the duty ratio (set duty ratio) included in the reference duty ratio range of 2 to 10%, and the light emitting unit 19 may selectively operate each of the optical devices 18a to 18g when operated, or stop operations of all the optical devices 18a to 18g when stopped.

As already known, the data processor 29 is communicatively connected with the electronic communication device 30 by controlling the microphone 15, the speaker 17 and the communication unit 21 to perform a phone call function, and is communicatively connected with the electronic communication device 30 by controlling the speaker 17 and the communication unit 21 to perform a sound reproduction function. In this embodiment, the light emission function is described in detail.

In the case of the light emission function, the data processor 29 controls the light emitting unit 19 to operate and stop light emission. In case of light emission, the data processor 29 emits near-infrared rays having the set wavelength, the set frequency, and the set light intensity respectively included in the reference wavelength range, the reference frequency range, and the reference light intensity range at the set duty ratio included in the reference duty ratio. In addition, the data processor stores set light emission information including at least one of the reference wavelength range and the set wavelength, the reference frequency range and the set frequency, the reference light intensity range and the set light intensity, and the reference duty ratio and the set duty ratio.

In addition, the data processor 29 may independently turn on and off each of the optical devices 18a to 18g by controlling the light emitting unit 19 using the set light emission information.

In addition, the data processor 29 performs a weak stimulation emission mode, a strong stimulation emission mode, and a complex stimulation emission mode, as emission modes for controlling the light emitting unit 19 and the optical devices 18a to 18g.

First, the weak stimulation emission mode is a mode in which near-infrared rays are emitted to the second emission area by each of the optical devices 18a to 18b.

Next, the strong stimulation emission mode is a mode in which near-infrared rays are emitted to the first emission area by each of the optical devices 18c to 18g.

Next, the complex stimulation emission mode is a mode in which a weak stimulation emission mode and a strong stimulation emission mode are simultaneously performed and in which near-infrared rays are emitted to the first and second emission areas by each of the optical devices 18a to 18g.

In the emission modes described above, when the same near-infrared rays are emitted, the intensity of stimulation is in the order of the complex stimulation emission mode>the strong stimulation emission mode>the weak stimulation emission mode.

The data processor 29 may control the light emitting unit 19 in an emission mode according to a selection input of the emission mode from the input unit 11 or may receive a performing command for an emission mode from the electronic communication device 30 and control the light emitting unit 19 in the emission mode corresponding to the received performing command.

In addition, as described above, the data processor 29 reads the stored set light emission information independently of the electronic communication device 30 or without the control of the electronic communication device 30 and perform the light emission function according to the set light emission information, but in the following, it is described that the light emission function is performed by the control of the electronic communication device 30.

The electronic communication device 30 corresponds to an electronic device such as a smartphone, a tablet, or the like, and includes an input unit 31 acquiring an input (e.g., operation and stop of a light emission function, input and correction of the set light emission information, selection of an emission mode, etc.) from the user and applying the acquired input to the data processor 39, a display unit 33 visually and/or audibly displaying the operation and stop of the light emission function and the set light emission information, a communication unit 35 performing wireless communication with the sound converting device 10, and a data processor 39 performing a phone call function, a sound reproduction function, and a light emission function as described above. Here, a power supply unit (not shown), the input unit 31, the display unit 33, and the communication unit 35 are naturally recognized by those skilled in the art to which the present disclosure pertains, and thus, detailed descriptions thereof will be omitted.

The data processor 39 acquires an operation input or an operation stop input of the light emission function from the input unit 31 and transmits the acquired input to the sound converting device 10 through the communication unit 35. The data processor 29 receives an operation input or an operation stop input of the light emission function through the communication unit 21 and operates or stops the light emission function according to the received input.

In addition, the data processor 39 requests the set light emission information from the sound converting device 10 in a communication connection state with the sound converting device 10 through the communication unit 35, reads the stored set light emission information and transmits the read set light emission information to the electronic communication device 30 in response to the request. The data processor 39 receives the set light emission information and displays the received set light emission information through the display unit 33 so that the user may check the information. The data processor 39 acquires a correction input or the like for the displayed set light emission information through the input unit 31, corrects the set light emission information, and stores the corrected set light emission information. When the set light emission information is corrected, each of the wavelength, frequency, light intensity, and duty ratio included in the reference wavelength range, the reference frequency range, the reference light intensity range, and the reference duty ratio may be varied and may be corrected according to the correction input from the input unit 31. However, the light intensity included in the reference light intensity range corresponds to each of the physical characteristics, and thus may not be varied.

The data processor 39 transmits the corrected set light emission information to the sound converting device 10 through the communication unit 35. The data processor 29 receives the corrected set light emission information through the communication unit 21 and stores the corrected set light emission information, and thereafter, the data processor 29 performs a light emission function according to the corrected set light emission information.

In addition, the data processor 39 displays the emission mode selectable by the wearer on the display unit 33, and acquires a selection input of the emission mode from the input unit 31. The data processor 39 transmits a command for performing an emission mode, which is an acquired selection input, to the sound converting device 10 through the communication unit 35, so that the selected emission mode is performed.

The above light emission function may be performed independently or in parallel to the sound reproduction function or the phone call function.

In order to detect a physical and mental stability of a human body, electroencephalogram (EEG) is used. EEG includes major factors such as delta waves, theta waves, alpha waves, beta waves, and gamma waves, which are brain waves of a brain, and may confirm whether it is in a stable state by a ratio between the major factors.

In order to maintain a physical and mental stability, there is a well-known meditation method, which, however, has a significant difference in results according to skill levels and requires a long skill time to reach or maintain a desired stable state and considerable efforts. In contrast, the sound converting device 10 according to the present disclosure may provide an effect equal to or greater than that of meditation by performing near-infrared ray emission according to each factor in the aforementioned set light emission information, regardless of skill level.

As an example, in an experiment in which a process including 5-minute break, 20-minute meditation or stimulation by near-infrared ray emission, and 5-minute break was applied to a plurality of wearers, EEG results according to stimulation by meditation and near-infrared ray emission were derived to be almost the same.

In addition, in the above embodiment, after wearers wore an electrocardiogram (ECG) sensor and a photo-plethysmography (PPG) sensor, a heart rate variability (HRV) analysis was performed, while VNS stimulation was performed, and from the HRV analysis, time domain parameters (e.g., mean HRT, standard deviation of average NN interval (SDANN), RMSSD, PSI, etc.) and frequency domain parameters (e.g., total power (TP), very low frequency (VLF), low frequency (LF), high frequency (HF), normalized LF and normalized HF, LF/HF ratio, etc.) are calculated. Table 1 shows values of the time domain parameters, and Table 2 shows values of the frequency domain parameters.

TABLE 1

| Parameter (unit) | 5-minute break | 10-minute break | 5-minute stimulation | 10-minute stimulation | 15-minute stimulation |
|---|---|---|---|---|---|
| Mean HRT (bpm) | 65.54 | 66.35 | 67.46 | 63.59 | 65.19 |
| SDANN (ms) | 66.78 | 48.78 | 46.67 | 66.73 | 51.80 |
| RMSSD (ms) | 73.49 | 50.47 | 48.67 | 60.36 | 52.94 |

TABLE 2

| Parameter (unit) | 5-minute break | 10-minute break | 5-minute stimulation | 10-minute stimulation | 15-minute stimulation |
|---|---|---|---|---|---|
| LF/HF | 2.64 | 1.71 | 1.70 | 1.70 | 1.51 |
| Normal LF(%) | 72.52 | 63.10 | 62.97 | 63.03 | 60.19 |
| Normal HF(%) | 27.48 | 36.90 | 37.03 | 36.97 | 39.81 |

It can be seen that, by stimulation based on near-infrared ray emission according to the present disclosure, parameters according to an HRV analysis were above normal in all ranges as shown in Table 1, the mean HRT was lowered after stimulation to activate a function of the parasympathetic nervous system.

In addition, as shown in Table 2, it can be seen that both the sympathetic nervous system and the parasympathetic nervous system were maintained in a stable state during stimulation based on near-infrared ray emission, and the stimulation for the parasympathetic nervous system was more active than the stimulation for the sympathetic nervous system, so that a heartbeat was stabilized and homeostasis was increased.

The sound converting device 10 according to the present disclosure may control an intensity of stimulation in the vagas nerve and the effect according to the intensity of the stimulation by selectively or simultaneously providing stimulation based on near-infrared light emission to the vagas nerve by emission areas.

According to various embodiments, at least a portion of the device (e.g., modules or functions thereof) or the method (e.g., operations) may be implemented, for example, as instructions stored in a non-transitory computer-readable storage medium in a programming module form. When the instructions are executed by a processor, the processor may execute a function corresponding to the instructions. The computer-readable storage medium may be, for example, the memory.

The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices (e.g., read only memory (ROM), random access memory (RAM), or flash memory). In addition, program instructions may include high class language codes, which can be executed in a computer by using an interpreter, as well as machine codes made by a compiler. The hardware devices described above may be configured to operate as one or more software modules to perform the operations of various embodiments, and vice versa.

A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added.

While the present disclosure has been shown and described in connection with the embodiments, it will be apparent to those skilled in the art that modifications and variations may be made without departing from the spirit and scope of the invention as defined by the appended claims.

What is claimed is:

1. A sound converting device having a near-infrared ray emission function, the sound converting device comprising:
   a body portion having an accommodating space therein;
   an eartip mounted on a first side of the body portion and having a sound passage;
   a speaker configured to emit sound through the sound passage;
   a microphone formed on the body portion;
   a communication unit configured to perform communication with an electronic communication device;
   a light emitting unit mounted on at least one of the body portion, the eartip, and the sound passage, and configured to emit a near-infrared ray; and
   a data processor configured to control the communication unit to perform communication with the electronic communication device, to control the speaker and the microphone to perform a sound reproduction function and a phone call function, and to control the light emitting unit to perform light emission,
   wherein the light emitting unit includes at least one first optical device configured to emit a near-infrared ray to a first emission area and at least one second optical device configured to emit a near-infrared ray to a second emission area,
   wherein the data processor is configured to adjust an intensity of stimulation to a wearer by performing any one of a first emission mode based on an operation of the first optical device, a second emission mode based on an operation of the second optical device, and a third emission mode based on an operation of the first and second optical devices,
   wherein the first emission area includes an auricular concha or an ear auricle and the second emission area includes an ear canal in a state in which the sound converting device is worn on the wearer's ear,
   wherein stimulation to the wearer based on the first emission mode is stronger than stimulation to the wearer based on the second emission mode and stimulation based on the wearer based on the third emission mode is stronger than stimulation to the wearer based on the first emission mode when the same near-infrared ray is emitted,
   wherein the data processor is configured to adjust an intensity of stimulation to a vagas nerve of the wearer by selecting an emission area corresponding to any one of the first to third emission modes.

2. The sound converting device of claim 1, wherein:
   the data processor is configured to control the light emitting unit according to set light emission information;
   the set light emission information includes a set wavelength included in a reference wavelength range, a set frequency included in a reference frequency range, a set light intensity included in a reference light intensity range, and a set duty ratio included in a reference duty ratio;
   the light emitting unit is configured to emit a near-infrared ray having the set wavelength, the set frequency, and the set light intensity at the set duty ratio; and
   the reference wavelength range is 810 to 900 nm, the reference frequency range is 1 Hz to 1 kHz, the reference light intensity range is 16 to 26 mW/cm$^2$, and the reference duty ratio is 2 to 10%.

3. The sound converting device of claim 2, wherein the set wavelength, the set frequency, the set light intensity, and the set duty ratio are varied within the reference wavelength range, within the reference frequency range, within the reference light intensity range, and within the reference duty ratio, respectively.

4. A sound converting system, comprising:
   the sound converting device of claim 1; and
   an electronic communication device including a communication unit communicatively connected with the sound converting device, a display unit, an input unit, and a data processor configured to receive set light emission information from the sound converting device through the communication unit, to display the received set light emission information through the display unit, to acquire a correction input for the set light emission information displayed through the input unit, to correct the set light emission information, and to transmit the corrected set light emission information to the sound converting device through the communication unit,
   wherein the sound converting device is configured to receive the corrected set light emission information and store the received set light emission information.

5. A sound converting system, comprising:
   the sound converting device of claim 1; and
   an electronic communication device communicatively connected to the sound converting device and configured to transmit a command for performing any one of the first to third emission modes to the sound converting device.

* * * * *